United States Patent [19]

Fujikawa et al.

[11] Patent Number: 5,137,755
[45] Date of Patent: Aug. 11, 1992

[54] IMPREGNATING CARBONIZING PROCESS AND APPARATUS

[75] Inventors: Takao Fujikawa; Takahiko Ishii, both of Kobe, Japan

[73] Assignee: Kabushiki Kaisha Kobe Seiko Sho, Kobe, Japan

[21] Appl. No.: 656,691

[22] Filed: Feb. 19, 1991

Related U.S. Application Data

[62] Division of Ser. No. 374,782, Jul. 3, 1989, Pat. No. 5,022,343.

[30] Foreign Application Priority Data

Jul. 5, 1988 [JP] Japan .................. 63-167344

[51] Int. Cl.⁵ .............................................. B05D 3/02
[52] U.S. Cl. ..................................... 427/228; 118/47; 118/50.1; 264/29.5; 264/29.6; 264/29.7; 427/296; 427/384; 427/443
[58] Field of Search .................... 118/47, 50, 50.1; 427/227, 228, 294, 377, 384, 443, 296; 264/29.5, 29.7, 102, 29.6

[56] References Cited

U.S. PATENT DOCUMENTS

| | | | |
|---|---|---|---|
| 2,177,497 | 5/1938 | Owens et al. | 264/102 X |
| 3,448,719 | 6/1969 | Tate | 118/50 |
| 4,384,014 | 5/1983 | Young | 118/50 X |
| 4,454,177 | 6/1984 | Feist | 427/294 |
| 4,514,371 | 4/1985 | Jamet et al. | 264/29.5 X |
| 4,709,656 | 12/1987 | Fujiyama | 118/50.1 X |

FOREIGN PATENT DOCUMENTS

62-84291 4/1987 Japan.

Primary Examiner—Michael G. Wityshyn
Attorney, Agent, or Firm—Oblon, Spivak, McClelland, Maier & Neustadt

[57] ABSTRACT

An impregnating carbonizing process and apparatus which permit reduction in cost of consumable goods and can operate at a reduced cost and a heating and vacuum impregnating operation which requires a very long period of time can be performed on the outside of an expensive high pressure vessel to accomplish rapid carbonization and baking. The process comprises of inserting a porous shaped body of carbon and a block of impregnant into a specimen case, discharging gas from within the specimen case, heating the impregnant into a molten condition under a reduced pressure, inserting the specimen case into a high pressure vessel, admitting high pressure gas into the high pressure vessel and also into the specimen case so as to penetrate the impregnant into the shaped body of carbon, heating the shaped body to a high temperature, and discharging the high pressure gas to lower the pressure within the specimen case at a controlled rate in response to a pressure within the high pressure vessel to carbonize the impregnant. The apparatus is constructed to suitably carry out the process.

8 Claims, 6 Drawing Sheets

IMPREGNATING CARBONIZING PROCESS AND APPARATUS

This is a division of application Ser. No. 07/374,782, filed on Jul. 3, 1989, now U.S. Pat. No. 5,022,343.

BACKGROUND OF THE INVENTION

1. Field of the Invention

This invention relates to an impregnating carbonizing process and apparatus for impregnating a porous shaped body of carbon with tar pitch or resin and carbonizing the tar pitch or resin to produce a carbon material of a high density.

2. Description of the Prior Art

In recent years, composite materials of carbon fiber and carbon materials (hereinafter referred to as C/C composite materials) have come into wide use as new materials in the aerospace and aircraft work for rocket nozzles, aircraft brakes and so forth. Further, attention is paid also to application of such C/C composite materials as a structural material for a high temperature furnace or a tray material which is used in an inert atmosphere because they have characteristics that they are light in weight and high in strength and have a small heat capacity and that they are high in impact strength.

Also with regard to conventional graphite materials, the quality has been improved in recent years, and the demand is increasing for fine materials which are fine in crystal grain and small in quantity of pores.

However, one of the greatest technical subjects in production of such carbon materials resides in how to attain a high density. Particularly, establishment of a technique of achieving a high density in an industrial scale, that is, establishment of a technique of mass production of carbon materials of a high density, is a serious subject.

As a technique of improving the high density of such materials, conventionally a process is employed wherein a porous shaped body is impregnated with a carbonizable substance such as tar pitch or resin and then the carbonizable substance is carbonized. Normally, a porous shaped body is impregnated in vacuum and then baked under the atmospheric pressure.

Figure 5:
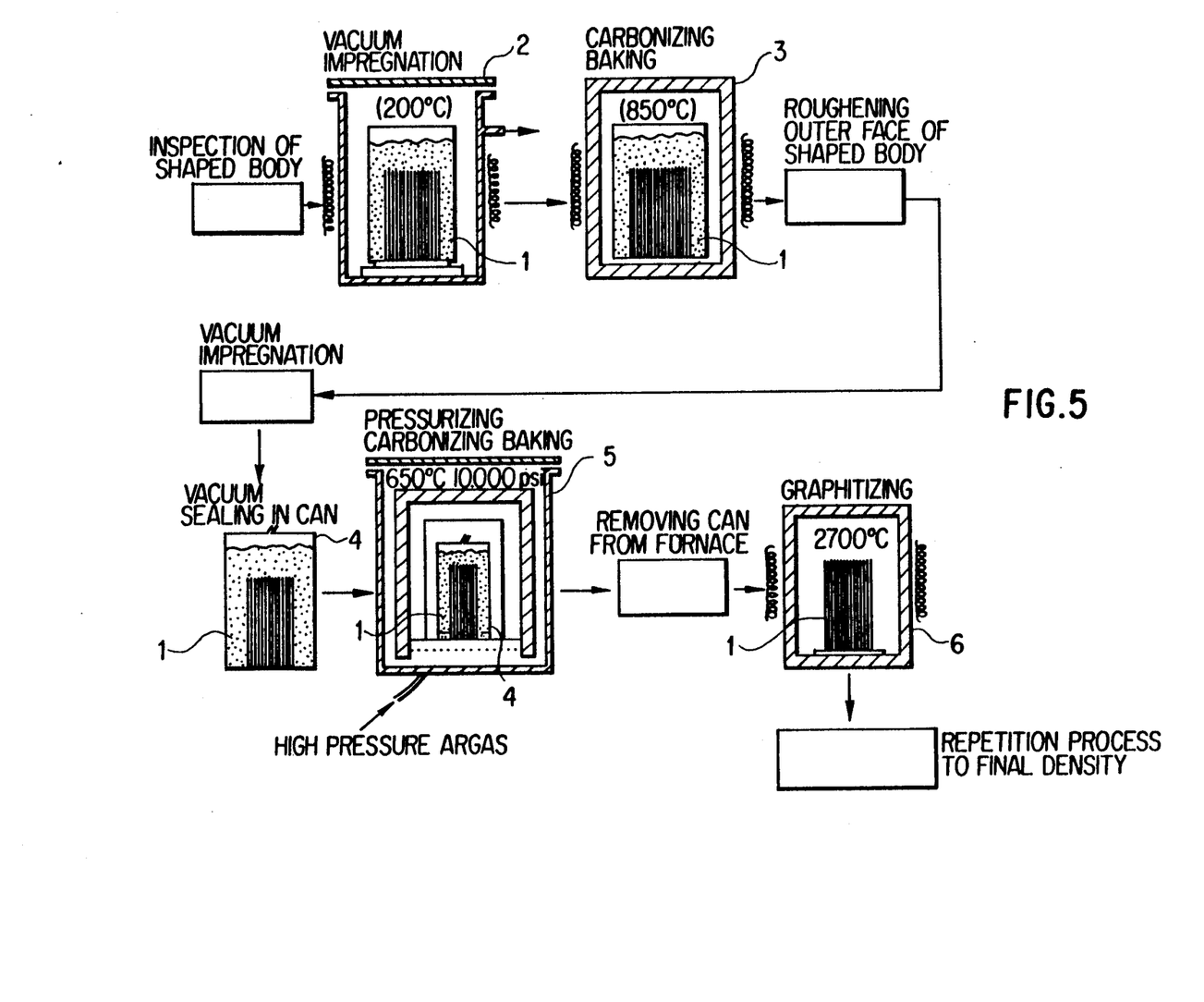
FIG. 5 is a diagrammatic representation illustrating a conventional impregnating carbonizing process.

As a technique of impregnating a porous shaped body with tar pitch in vacuum and carbonizing the tar pitch under a pressure of high pressure gas, such a technique, for example, as illustrated in FIG. 5 is already known. The object of the technique is a C/C composite material, and an original shaped body consists mainly of carbon fiber. Referring to FIG. 5, a shaped body 1 is inserted into a vacuum vessel 2, and then, the shaped body 1 is impregnated with tar pitch in vacuum at a temperature of 200° C. After such impregnation, the shaped body 1 is inserted into a baking furnace 3 in which it is heated to a temperature of 850° C. under the atmospheric pressure to carbonize the tar pitch. Then, the outer face of the shaped body thus obtained is roughened, and then, it is inserted into an airtight can 4 together with tar pitch and impregnated with the tar pitch in vacuum again, whereafter the can 4 is sealed to maintain the inside of the can 4 in a vacuum condition. Subsequently, the thus sealed can 4 is inserted into a high temperature, high pressure furnace 5 in which a pressure of argon gas is applied to the can 4 to heat and pressurize the shaped body 1. Thus, the shaped body 1 is carbonized finally in the conditions of a temperature of 650° C. and a pressure of 10,000 psi (about 700 kg/cm$^2$). After such carbonization, the can 4 is removed from the furnace 5, and the shaped body 1 is inserted into a high temperature furnace 6 and heated to a temperature of 2,700° C. to graphitize the shaped body 1.

When tar pitch is heated and carbonized in an atmosphere of inert gas such as argon gas under a high pressure, carbon produced at the heating carbonizing step may possibly stick to an energizable member such as a heater to cause a damage to insulation or a short-circuiting accident of the energizable member. In order to prevent such possible trouble, the method which employs such a can 4 for enclosing tar pitch therein as described above or another method which employs a specimen case is adopted. The latter method is disclosed, for example, in Japanese Patent Laid-Open No. 62-84291 and Japanese Utility Model Laid-Open No. 63-57500. As an example wherein a specimen case is employed, an apparatus which is disclosed in Japanese Laid-Open No. 62-84291 is shown in FIG. 6.

Figure 6:
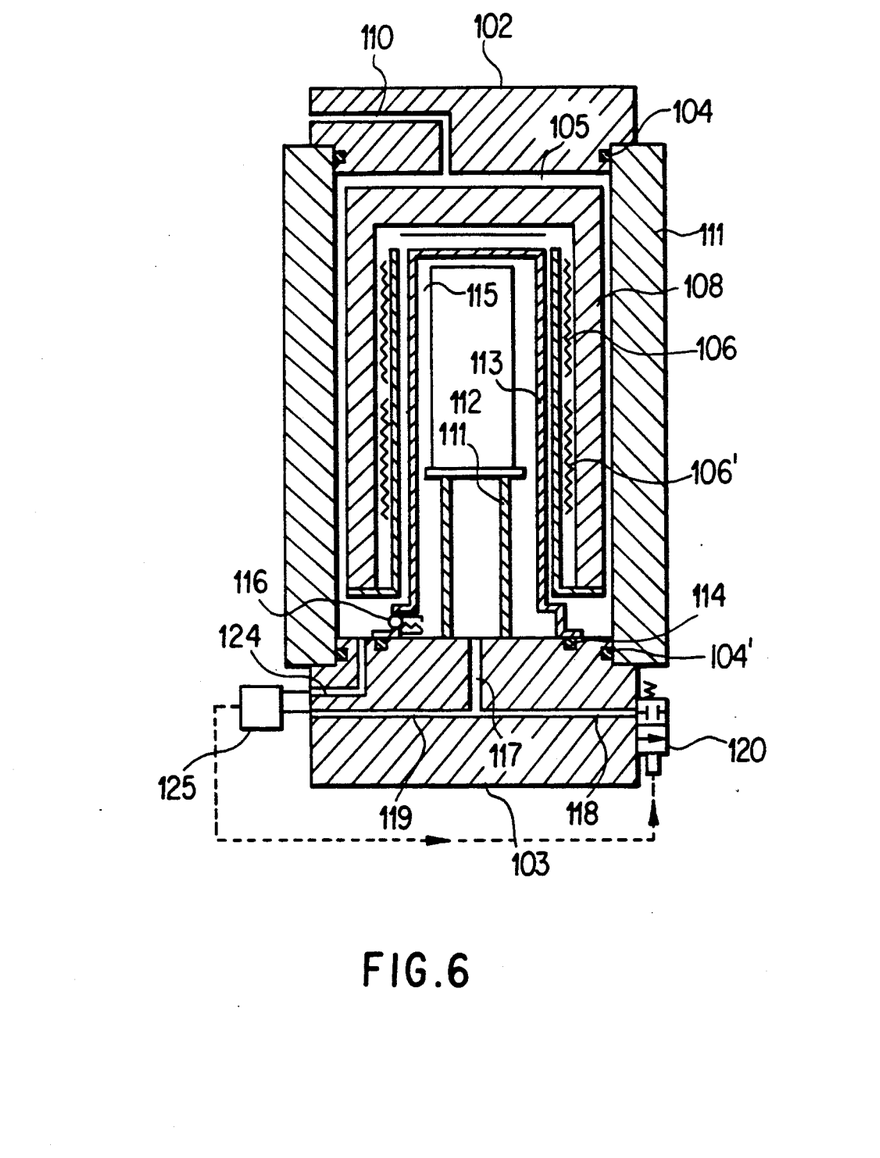
FIG. 6 is a schematic sectional view showing a conventional impregnating carbonizing apparatus.

Referring to FIG. 6, a high pressure vessel 101 has an upper lid 102 and a lower lid 103 fitted in upper and lower openings thereof. The fitted portions of the high pressure vessel 101 with the upper and lower lids 102 and 103 are held in an airtight condition by a pair of seal members 104 and 104', respectively, and a high pressure chamber 105 is defined in the high pressure vessel 101. A pressure of gas acting upon the lids 102 and 103 is supported by a press frame (not shown), and a pair of heating members 106 and 106' and a heat insulating layer 108 are disposed in the inside of the high pressure vessel 101. The heating members 106 and 106' are each composed of an electric heating resistor wire for heating a work 112 to be processed and have a tubular holder 107. The heat insulating layer 108 is provided to restrain heat from being transmitted from the heating members 106 and 106' to the high pressure vessel 101 and the upper and lower lids 102 and 103.

An airtight chamber 115 is formed in a processing chamber 109 on the inner sides of the heating members 106 and 106' and partitioned by an impermeable partition wall 113.

In the case of the apparatus shown in FIG. 6, the airtight chamber 115 is defined by a tube of an inverted cup shape connected uprightly to the lower lid 103 in an airtight relationship by means of a seal member 114.

Generally, the tubular partition wall 113 is preferably made of a metal material such as stainless steel, inconel, molybdenum or tungsten in order to assure the impermeability to gas. However, depending upon a temperature requirement, it is also possible to employ an inorganic material such as impermeable graphite.

The work 112 to be processed is removably inserted into the airtight chamber 115 of the tubular partition wall 113 by way of a furnace floor 111. Further, the partition wall 113 is provided with a check valve 116 which establishes communication between the inside and the outside of the airtight chamber 115 to permit gas to flow from the outside into the inside of the airtight chamber 115 but prevent gas to flow from the inside to the outside of the airtight chamber 115.

In order to assure a valve function of the check valve 116, a seal member such as an O-ring is sometimes used for the valve section. From the point of view of heat resistance of a spring of the check valve 116, the check valve 116 is preferably disposed at a lower location of the airtight chamber 115 at which the temperature is comparatively low.

According to circumstances, the check valve 116 may be provided in a duct line system which is provided in the inside of the lower lid 103 constituting part of the partition wall for establishing communication between the inside and the outside of the airtight chamber 115.

In the apparatus shown in FIG. 6, duct lines 117, 118 and 119 for communicating the airtight chamber 115 to the outside of the high pressure vessel are formed in the lower lid 103, and an opening and closing valve 120 is provided in the duct line 118.

A further duct line 124 is formed in the lower lid 103 and communicates with the processing chamber 105, and the opening and closing valve 120 is moved to an open position in response to an electric signal from a pressure difference detector 125 which is connected to the duct line 124 and the duct line 119 in the lower lid 103.

Subsequently, a processing method with the apparatus shown in FIG. 6 and functions of the individual members for such processings will be described.

The gas in the inside of the processing chamber 105 of the high pressure vessel 101 is discharged, for example, by way of a duct line 110 formed in the upper lid 102 by means of a vacuum pump (not shown), and after then, inert gas such as argon gas is introduced into the processing chamber 105 similarly by way of the duct line 110.

In this instance, while the outside of the airtight chamber 115 can be put into a vacuum condition by such discharging of the internal gas, the inside of the airtight chamber 115 cannot be put into a vacuum condition due to the presence of the check valve 116. Therefore, in order to discharge the gas from the inside of the airtight chamber 115 until a vacuum condition is reached, the duct lines 117 and 118 in the lower lid 103 are used.

Also in the inert gas introducing operation, it is advantageous to introduce gas by way of the duct line 110 in the upper lid 102 while the duct lines 117 and 118 in the lower lid 103 are utilized to discharge the internal gas in order to accomplish replacement of gas in the airtight chamber 115 perfectly.

After water or oxygen which is bad for materials of the components of the apparatus or the work 112 to be worked is removed by such air discharging and gas introducing operations, argon gas is sent into the inside of the processing chamber 105 to a predetermined pressure by way of the duct line 110.

After the pressure medium gas is filled fully into the processing chamber 105, power is supplied to the heating chambers 106 and 106' to heat the work 112. In this instance, however, the rise in pressure when the temperature rises is greater on the inside of the airtight chamber 115 than on the outside of the airtight chamber 115. Accordingly, an excessive amount of the internal pressure may be discharged outside the high pressure vessel 101 by opening the opening and closing valve 120.

The opening and closing valve 120 is opened in response to an electric signal which is delivered from the pressure difference detector 125 when the difference between the external pressure and the internal pressure of the airtight chamber 115 which is detected by the pressure difference detector 125 reaches a predetermined value.

On the other hand, an improved technique of an HIP (hot isostatic pressing) equipment is disclosed in Japanese Patent Publication No. 58-46524 though not used for impregnation nor carbonization of a carbon material.

The prior art is intended for application to a hot isostatic pressing method for shaping and sintering powder, a method for processing a material for a sintered tool at a high temperature under a high pressure or a high pressure bonding method for bonding a turbine blade to a turbine body. The improved HIP equipment is constructed such that a heat insulating layer, a heater, a work to be processed and a lower lid may be removed in an integral relationship from a high pressure vessel, and a pre-heating operation can be performed outside the HIP equipment without occupying the expensive high pressure vessel. In particular, with the improved HIP equipment, in order to reduce the cycle time of the HIP processing, a work to be processed is placed in advance on the lower lid outside the HIP vessel, and the heater and the heat insulating layer are set in position around the work. In this condition, the heater is energized to pre-heat the same before the work is inserted into the high pressure vessel of the HIP equipment, and after such pre-heating, the work, lid, heater and heat insulating layer are set in position in an-integral relationship into the high pressure vessel of the HIP equipment. Consequently, the time required for raising the temperature of the work in the high pressure vessel of the HIP equipment to a predetermined level can be reduced.

The prior art equipments described above, however, have the following drawbacks. In particular, with the arrangement shown in FIG. 5 wherein the shaped body 1 is enclosed in the can 4, the can 4 is contracted and deformed to disable re-use thereof because a pressure of up to 700 kgf/cm$^2$ is finally applied to the shaped body 1 from the outside of the can 4. Therefore, it is necessary to produce a new can 4 each time the processing described above is to be performed. Accordingly, the cost of consumable goods is increased due to production of such can 4. Further, the expense for sealing operation is also required. Thus, the prior art requires a high processing cost.

Besides, in the process wherein tar pitch is carbonized, gas such as hydrocarbon or hydrogen is generated. Then, if the pressure within the can is increased by the gas thus generated and finally exceeds a pressure of argon gas outside the can, the can may be swollen and broken. In order to prevent this, it is necessary to cause the hydrocarbon in the can to be decomposed rapidly into carbon and hydrogen and raise the temperature. While waiting, the hydrogen is diffused into a wall of the can and passes through the same to the outside of the can. Accordingly, there is a drawback that a long period of time is required for a required temperature rise.

Meanwhile, with the prior art disclosed in Japanese Patent Laid-Open No. 62-84291 and Japanese Utility Model Laid-Open No. 63-57500 wherein a specimen case is used, a series of operations (steps) of melting tar pitch and impregnating a porous shaped body with the tar pitch are performed in the high pressure vessel also as apparently seen from FIG. 6. Then, when the tar pitch is melted, it is heated to a temperature of 200° to 300° C. However, the heat conductivity of tar pitch is as low as a level of that of a resin. Accordingly, a very long period of time is required until the tar pitch is melted, and consequently, the utilization efficiency of the expensive high pressure vessel is very low. In the case of, for example, a specimen having a diameter greater than 20 cm, 10 to 20 hours are required.

To the contrary, the prior art disclosed in Japanese Patent Publication No. 58-46524 is not suitable to impregnate a porous shaped body with tar pitch and carbonize the tar pitch. Thus, in order to perform an impregnating operation at first, it is necessary to heat tar pitch into a molten condition in vacuum. However, since the heater and the work to be processed are disposed in the same spacing, components which will be gasified at a heating and melting step (low boiling point components) will stick to the heater and so forth, which may cause a damage to insulation. Accordingly, the prior art cannot be used actually.

SUMMARY OF THE INVENTION

It is an object of the present invention to provide an impregnating carbonizing method and apparatus which permit reduction in cost of consumable goods and can operate at a reduced cost.

It is another object of the present invention to provide an impregnating carbonizing method and apparatus wherein a heating and vacuum impregnating operation which requires a very long period of time can be performed on the outside of an expensive high pressure vessel to accomplish rapid carbonization and baking.

In order to attain the objects, according to one aspect of the present invention, there is provided an impregnating carbonizing process which comprises the steps of inserting a porous shaped body of carbon and a block of impregnant into a specimen case which has a gas admitting valve which is opened to admit gas from the outside into the inside of the specimen case when a predetermined difference in pressure is caused between the outside and the inside of the specimen case and which further has a gas discharging opening for discharging the internal gas of the specimen case therethrough, discharging, at a reduced pressure impregnating station, gas from the inside of the specimen case by way of the gas discharging opening of the specimen case, heating the impregnant from the outside of the specimen case to melt the impregnant under a reduced pressure, inserting the specimen case into a high pressure vessel at a high pressure impregnating carbonizing station, admitting gas of a high pressure into the high pressure vessel until the high pressure gas is admitted into the specimen case by way of the gas admitting valve so as to penetrate the impregnant into the shaped body of carbon under the pressure of the high pressure gas, heating the shaped body to a high temperature, and discharging the high pressure gas by way of the gas discharging opening to lower the pressure within the specimen case at a controlled rate in response to a pressure within the high pressure vessel to carbonize part or the entirety of the impregnant.

With the process, the reduced pressure impregnating step, pressurizing impregnating step and carbonizing baking step are performed successively in this order, and the reduced pressure impregnating step is carried out at the reduced pressure impregnating station, and the other two steps are carried out at the pressurizing impregnating and carbonizing station. At the reduced pressure impregnating station, the gas in the specimen case is discharged outside by way of the gas discharging opening, and the specimen case is heated from the outside. Consequently, the impregnant in the specimen case is heated into a molten condition under a reduced pressure so that it may be penetrated into pores of the porous shaped body of carbon in vacuum.

In this instance, since the reduced pressure impregnating step is performed outside the high pressure vessel, the high pressure vessel is not occupied by the porous shaped body of carbon for a long period of time although a long of time is required for melting of the impregnant.

Further, since the specimen case is heated from the outside and is disconnected from the outside except at the gas discharging opening and the gas admitting valve and the gas discharging opening is connected to the pressure reducing means while the gas admitting valve prevents gas from flowing out of the specimen case, gas generated in the sample case will not cause such a trouble as damage to insulation.

After completion of the reduced pressure impregnating step, the specimen case is transported to the pressurizing impregnating and carbonizing station and placed into the high pressure vessel.

At the pressurizing impregnating and carbonizing station, at first gas is supplied into the high pressure vessel. The gas is admitted into the specimen case by way of the gas acts admitting valve. Consequently, the pressure of the gas acts directly upon a free surface of the molten liquid of the impregnant so that the impregnant is caused to penetrate into the porous shaped body of carbon under pressure.

Subsequently, the specimen case is heated from the outside by means of the heater disposed in the high pressure vessel so that carbonizing baking is carried out in a high pressure, high temperature condition.

In this instance, there is a tendency for the internal pressure of the specimen case to become higher than the external pressure of the specimen case. This is because gas is generated as such carbonizing baking proceeds.

Accordingly, there is the possibility that the specimen case may be swollen or broken by the internal pressure. According to the process of the present invention, however, since the internal gas is discharged by way of the gas discharging opening to lower the internal pressure of the specimen case at a controlled rate, there is no such possibility as described just above. Accordingly, the specimen case can be used several times repetitively. Consequently, the cost of consumable goods can be reduced, and the processing cost can be reduced.

Thus, with the process of the present invention, the occupation time of the high pressure vessel in one impregnating carbonizing cycle is reduced as the impregnant melting operation and the vacuum impregnating operation are carried out outside the high pressure vessel, and the high pressure vessel is utilized effectively only at a step at which a high pressure processing is required. Consequently, the productivity is improved remarkably.

Further, since the pressurizing impregnating operation is carried out in addition to the vacuum impregnating operation and the impregnant is carbonized and baked under a high pressure, the yield of carbon is high, and accordingly, a carbon material can be produced at a high efficiency. Further, the specimen case can be used repetitively, which can reduce the processing cost. In addition, at either of the reduced pressure impregnating station and the pressurizing impregnating and carbonizing station, the inside of the specimen case is communicated with the outside by way of the gas discharging opening such that, at the reduced pressure impregnating station, the internal pressure of the specimen case is lowered, and at the pressurizing impregnating and carbonizing station, the internal pressure is reduced at a controlled rate. Consequently, gas generated in the specimen case will not flow out to the heater section, and accordingly, no damage to insulation will be caused at all.

According to another aspect of the present invention, there is provided an impregnating carbonizing apparatus which comprises a reduced pressure impregnating station, a high pressure impregnating carbonizing station, and a specimen case adapted to be supplied successively to the reduced pressure impregnating station and the high pressure impregnating carbonizing station and adapted to receive therein a porous shaped body of carbon and a block of impregnant, the specimen case having a gas admitting valve which is opened to admit gas of the outside of the specimen case into the inside of the specimen case when a predetermined difference in pressure is caused between the outside and the inside of the specimen case, the specimen case further having a gas discharging opening for discharging internal gas of the specimen case therethrough, the reduced pressure impregnating station including a bell-shaped furnace which is opened at a lower portion thereof so that the specimen case can be contained therein, a support table for supporting the specimen case thereon, and a pressure reducing means communicated with the gas discharging opening of the specimen case for discharging internal gas of the specimen case therethrough to lower the internal pressure of the specimen case, the high pressure impregnating carbonizing station including a high pressure vessel, a pair of upper and lower lids for closing openings at the opposite ends of the high pressure vessel, a heat insulating layer disposed in the high pressure vessel, a high pressure heating means disposed on the inner side of the heat insulating layer, and a control valve communicated with the gas discharging opening of the specimen case for lowering the internal pressure of the specimen case at a controlled rate.

With the impregnating carbonizing apparatus of the present invention, the cost of consumable goods is reduced, and the impregnating carbonizing process can be accomplished rapidly at a reduced cost. Consequently, production of high density carbon materials by the impregnating carbonizing process which makes use of a pressure of high pressure gas is enabled at an industrial level. Thus, the present invention exhibits a remarkable contribution to the field of carbon materials.

The above and other objects, features and advantages of the present invention will become apparent from the following description and the appended claims, taken in conjunction with the accompanying drawings.

DETAILED DESCRIPTION OF THE PREFERRED EMBODIMENTS

Figure 1:
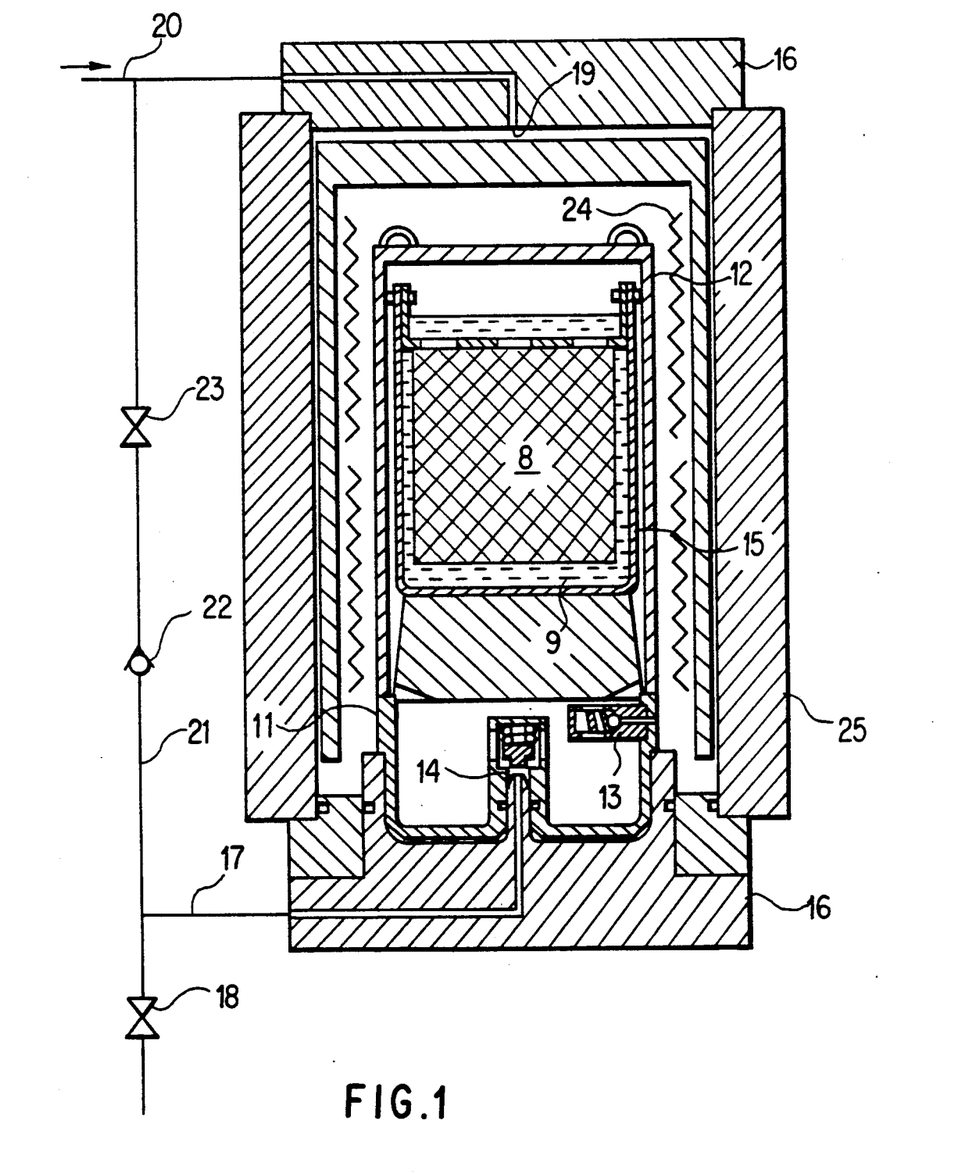
FIG. 1 is a schematic sectional view of a pressurizing impregnating station with which an impregnating carbonizing process according to the present invention is carried out.

Referring first to FIG. 1, there is shown a pressurizing impregnating station of an impregnating carbonizing apparatus according to which the present invention is applied. The pressurizing impregnating station includes a specimen case 11 having a lid 12 mounted in an airtight relationship at the top thereof. The specimen case 11 has a gas admitting valve 13 disposed in a side wall thereof.

The gas admitting valve 13 is opened when the difference between the external pressure and the internal pressure of the specimen case 11 becomes greater than a predetermined value, and when the gas admitting valve 13 is open, gas of the outside is introduced into the inside of the specimen case 11. The specimen case 11 has a gas discharging opening 14 formed therein, and a pipe 17 is connected to the gas discharging opening 14. The pipe 17 is communicated either with the atmospheric air or with a suitable gas discharging location (not shown). Thus, gas in the specimen case 11 is discharged through the gas discharging opening 14 by way of the pipe 17. It is to be noted that a control valve 18 is interposed intermediately in the pipe 17.

Meanwhile, the specimen case 11 is adapted to be inserted in its entirely into a high pressure vessel 25. A pair of lids 16 and 16' each in the form of layered plate are mounted in an airtight relationship at the longitudinal opposite ends of the high pressure vessel 25, and the pipe 17 extends through the lower lid 16 and is connected to the gas discharging opening 14. Further, the upper lid 16' has a high pressure gas admitting opening 19 perforated therein, and a pipe 20 is connected to the gas admitting opening 19. The pipe 20 is further connected to a supply source of high pressure argon (Ar) gas. Accordingly, high pressure argon gas can be introduced into the high pressure vessel 25 by way of the gas admitting opening 19. Another pipe 21 is connected to and extends between the pipes 17 and 20, and a check valve 22 is interposed intermediately in the pipe 21 for preventing gas from flowing from the pipe 20 side to the pipe 17 side. A control valve 23 is also provided intermediately in the pipe 21.

A heater 24 is disposed in the high pressure vessel 25 in such a manner as to surround the specimen case 11, and a work in the specimen case 11 is heated in the high pressure vessel 25 by the heater 24.

According to the process of the present invention, at first a container in which a shaped body 8 of carbon and a solid block 9 of an impregnant such as resin or tar pitch are contained is placed into the specimen case 11, and then, the lid 12 is mounted in an airtight relationship at the top of the case 11. Then, the entire case 11 is inserted into the high pressure vessel 25, and the lid 16 is fitted in an airtight relationship to the high pressure vessel 25 while at the same time an end of the pipe 17 is connected to the gas discharging opening 14 of the lid 12. It is to be noted that the pipe 17 is attached in advance to lid 16.

After the various members are set in position in this manner, the control valve 18 is brought into an open position and air in the specimen case 11 is discharged outside by means of a suitable vacuum pump (not shown), whereafter the inside of the case 11 is maintained in the reduced pressure condition. Then, the heater 24 is rendered operative to heat the impregnant 9 in the specimen case 11 to raise the temperature of the impregnant 9 to about 200° to 300° C. at which the impregnant 9 is melted. Consequently, the impregnant 9 is put into a condition of molten liquid.

Subsequently, the control valve 18 is brought into a closed condition, and argon gas of a high pressure is introduced into the high pressure vessel 15 by way of the pipe 20. Consequently, the high pressure vessel 15 is filled with argon gas of a high pressure, and if the difference between the internal pressure and the external pressure of the specimen case 11 exceeds a predetermined level, then argon gas of the high pressure is admitted into the specimen case 11 by way of the gas admitting valve 13. Consequently, the pressure of the argon gas acts directly upon a free surface of the molten liquid of the impregnant 9 in the specimen case 11 so that the impregnant 9 penetrates even into fine pores of the porous shaped body 8 of carbon to impregnate the shaped body 8 sufficiently with the impregnant 9.

After such impregnating step, the impregnant 9 is heated to gradually raise its temperature by the heater 24 to carbonize the impregnant 9 which is tar pitch or the like. At the carbonizing baking step, gas is produced in the specimen case 11, and if the pressure within the specimen case 11 should rise suddenly, then the valve 18 should be opened to suitably discharge the gas from within the specimen case 11 by way of the gas discharging opening 14.

By carbonizing and baking the shaped body 8 of carbon in this manner and then graphitizing it by an ordinary method, a C/C composite material of a high density is produced.

As described above, in the present embodiment, a pressure of gas is caused to act directly upon a free surface of molten liquid of impregnant such as tar pitch to impregnate a shaped body of carbon with the impregnant by the action of the high pressure gas. Further, the porous shaped body of carbon is baked directly in the high pressure gas atmosphere while the partial pressure of the gas of hydrocarbon and so on produced by a carbonizing reaction is maintained at a high level at the carbonizing step. Consequently, as distinct from the conventional process wherein a can is consumed each time a processing of an impregnating carbonizing step is carried out, according to the process of the present invention, the specimen case can be used several times repetitively. Accordingly, the processing cost can be reduced remarkably.

Further, in the present embodiment, in case the pressure of gas which is generated upon carbonization becomes too high, the gas can be discharged to the outside by way of the gas discharging opening. Accordingly, the specimen case will not be swollen by such gas. Consequently, in the apparatus of the present invention, the temperature can be raised at a high rate without a trouble, and the processing can be performed rapidly.

It is to be noted that, since an impregnant of tar pitch or resin is normally in the form of a solid block at a room temperature, it is necessary to heat the impregnant into a molten condition. In the embodiment described above, while the melting step of the solid impregnant is achieved by operation of the heater 24 in the high pressure vessel 15, a long period of time is required for such temperature rise because the heat conductivity of the impregnant is low. Consequently, the period of time for which the high pressure vessel 15 is occupied for a melting operation of the impregnant is long.

Thus, if the step of melting the impregnant 9 in a reduced pressure condition for vacuum impregnation is performed by another heating furnace outside the high pressure vessel 15 and then the specimen case 11 in which the impregnant in the molten condition is contained is put into the high pressure vessel 15, then the period of time for which the high pressure vessel 15 is occupied can be reduced. Consequently, the productivity will be improved.

Figure 2:
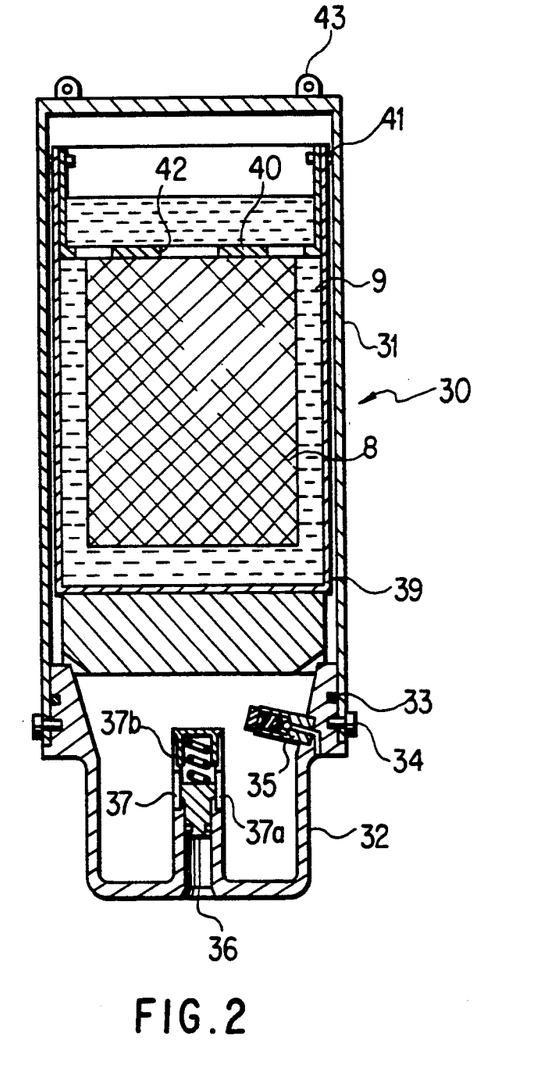
FIG. 2 is a schematic sectional view of a specimen case for use with an impregnating carbonizing apparatus to which the present invention is applied.
Figure 3:
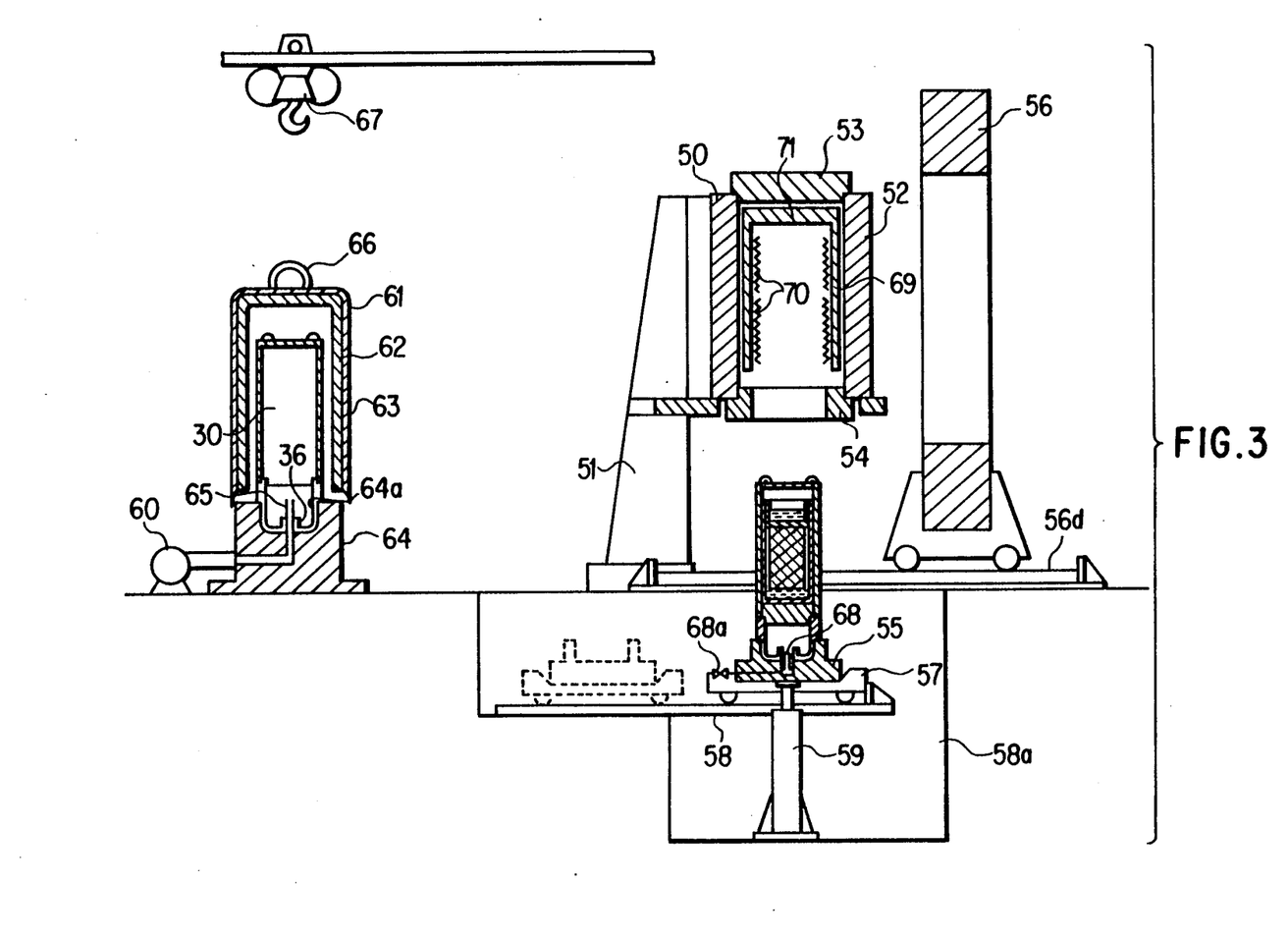
FIG. 3 is a diagrammatic representation showing an impregnating carbonating apparatus to which the present invention is applied.

FIG. 2 shows a specimen case which used in an impregnating carbonizing apparatus to which the present invention is applied, and such impregnating carbonizing apparatus is schematically shown in FIG. 3. Referring to FIGS. 2 and 3, specium case 30 made of a metal material includes a cup 31 in the form of a tube closed at an upper end thereof and opened at lower end thereof, and a vessel 32 opened at an upper end thereof. A lower end position of the cup 31 is fitted with an upper end portion of the vessel 32 with a seal ring 33 interposed therebetween so that the cup 31 and the vessel 32 are connected in an airtight relationship to each other. It is to be noted that the vessel 32 is secured to the cup 31 by means of a plurality of pins 34 so that it may not be pulled off from the latter.

At least one gas admitting valve 35 is provided at an upper portion of the vessel 32 of the specimen case 30. The gas admitting value 35 is opened in response to a difference between the external pressure and the internal pressure of the case 30 to permit argon gas of a high pressure to flow into the inside of the case 30 from the outside in order to fill the specimen case 30 with the high pressure argon gas at an inpregnating carbonizing step. Further, a gas discharging opening 36 is formed at a lower portion of the vessel 32 for suitably discharging gas within the case 30 so that the pressure of the gas within the case 30 may not be increased to an excessively high level. A value 37 is disposed at the gas discharging opening 36. A valve body 37a of the valve 37 is normally urged downwardly by a spring 37b to normally close the gas discharging opening 36. Only when a vacuum discharging port 65 or a gas port 68 which will be hereinafter described is inserted into the gas discharging opening 36 to push the valve body 37a to move upwardly against the urging force of the spring 37b, the valve 37 is opened to establish communication between the inside of the specimen case 30 and the port 65 or 68.

A container 39 is in the form of a cup-shaped vessel, for example, made of a metal material, and the container 39 is adapted to receive therein a porous shaped body 8 of carbon and a solid block 9 of impregnant such as tar pitch or resin.

A holding member 40 is secured at an upper end portion of the container 39 by means of a clamp 41. The holding member 40 has a plurality of holes 42 formed therein so as to permit the impregnant 9 to pass therethrough but prevent passage of the shaped body 8 of carbon therethrough. Accordingly, the holding member 40 has a function to prevent such situation that the shaped body 8 of a light weight may float in molten liquid of the impregnant 9 and be partially exposed outside from within the impregnant 9 to disable impregnation by application of a pressure of gas which will be hereinafter described.

A hanging ring 43 is mounted at the top of the cup 31 so that the specimen 30 may be hung at the hanging ring 43 thereof and moved to an arbitrary position by means of a crane or the like.

Meanwhile, as shown in FIG. 3, a bell-shaped furnace 61 as a reduced pressure heating furnace and a support table 64 are disposed at a reduced pressure impregnating station A on the floor for the impregnating carbonizing apparatus. A vacuum discharging port 65 is disposed uprightly at the center of the support table 64 with a suction opening thereof directed upwardly. The port 65 is connected to a vacuum pump 60 by way of a discharging path provided in the support table 64. A recess 64a is formed on an upper wall of the support table 64 for receiving the specimen case 30 therein.

The bell-shaped furnace 61 is lined with a heat insulating member 63, and a heater 62 is disposed on the inner side of the heat insulating member 63. A crane 67 is disposed on the ceiling of the apparatus, and a hanging ring 66 is mounted at the top of the bell-shaped furnace 61. Consequently, the bell-shaped furnace 61 can be moved by lifting the same at the hanging ring 66 thereof by means of the crane 67.

Meanwhile, a high pressure vessel 50 is mounted on a support post 51 provided uprightly on the floor of the impregnating carbonizing apparatus at a pressurizing impregnating and carbonizing station B. The high pressure vessel 50 includes a high pressure tube 52 having its axial directed vertically, an upper lid 53 in the form of a disk placed at an upper end of the high pressure tube 52, a lower outer lid 54 secured to a lower end of the high pressure tube 52, and a lower inner lid 55 formed as a separate member from the lower outer lid 54 but adapted to be integrated with the lower outer lid 54 when the high pressure vessel 50 is to be used.

Further, a heat insulating layer 71 is disposed on inner faces of the high pressure tube 52 and the upper lid 53. A heating device 69 is disposed on the inner side of the heat insulating layer 71. The heating device 69 is composed of a pair of tubular heaters 70 disposed with their axes directed vertically. It is to be noted that, though not shown, also the high pressure vessel 50 is constructed similarly to the high pressure vessel 15 shown in FIG. 1 such that high pressure argon gas can be admitted into and vacuum can be discharged from the inside of the high pressure vessel 50.

A pit 58a is formed in the floor at the pressurizing impregnating and carbonizing station B, and a rail 58 is provided in the pit 58a such that it may interconnect a location just below the high pressure vessel 50 and another location (retracted position) spaced from the former location. The lower inner lid 55 of the high pressure vessel 30 is placed on a transport bogie 57, and in this condition, the transport bogie 57 is moved back and forth along the rail 58. A gas port 68 is provided uprightly at the center of the lower inner lid 55 with a suction port thereof directed upwardly. The gas port 68 is connected to a suitable pipe by way of a hole formed in the lower inner lid 55. Then, by operating a valve 68a provided for the pipe, the gas port 68 is communicated with or disconnected from the atmospheric air. A lifting device 59 is disposed at the location in the pit 58a just below the high pressure vessel 50, and when the transport bogie 57 is positioned at the location just below the high pressure vessel 50, the lifting device 59 can move the lower inner lid 55 on the transport bogie 57 upwardly and downwardly. When the lower inner lid 55 is moved up to its upper limit position by the lifting device 59, the lower inner lid 55 is fitted in an airtight relationship into the lower outer lid 54 of the high pressure vessel 50.

Further, a press frame 56 in the form of an angular ring is disposed on the floor of the pressurizing impregnating and carbonizing station B with its axis directed horizontally. The press frame 56 is moved back and forth on a rail 56a provided on the floor.

Operation of the impregnating carbonizing apparatus having such a construction as described above will be described in the following.

A first, the pins 34 of the specimen case 30 shown in FIG. 2 are removed and the cup 31 and the vessel 32 are separated from each other. Then, the container 39 in which a solid block 9 of impregnant and a porous shaped body 8 of carbon are contained is inserted into the cup 31 of the specimen case 30. In this instance, the shaped body 8 is disposed in a region which is surrounded by the holding member 40 and the container 49 below the holding member 40.

Subsequently, an upper end portion of the vessel 32 is inserted into a lower end portion of the cup 31, and the vessel 32 is secured to the cup 31 by means of the pins 34. After then, the specimen case 30 is hung at the hanging ring 43 thereof by means of the crane 67, and the crane 67 is moved to transport the specimen case 30 to the reduced pressure impregnating station A shown in FIG. 3. Subsequently, the specimen case 30 is lowered until it is fitted into the recess 64a of the support table 64 to place the specimen case 30 on the table 64. In this instance, the vacuum discharging port 65 provided on the table 64 is inserted into the gas discharging opening 36 of the specimen case 30 to move the valve body 37a of the valve 37 upwardly against the urging force of the spring 37b to establish communication between the port 65 and the inside of the specimen case 30.

Then, the bell-shaped furnace 61 is hung at the hanging ring 66 thereof by the crane 67 and moved down until it is placed on the table 64 to cover the entire specimen case 30 with the bell-shaped furnace 61. Then, the air in the inside of the specimen case 30 is discharged by way of the port 65 by means of the vacuum pump 60, and then, while the inside of the specimen case 30 is maintained in the reduced pressure condition, the heater 62 of the bell-shaped furnace 61 is rendered operative to heat the solid impregnant 9 in the inside of the specimen case 30 to a temperature of about 200° to 300° C. to put the impregnant 9 into a condition of molten liquid. In this instance, since the shaped body 8 is prevented from floating up by the holding member 40, it is maintained in a dipped condition in the impregnant 9. Accordingly, since tar pitch or the like of the impregnant 9 surrounds the entire shaped body 8, a vacuum impergnanting processing is performed to some degree.

After then, the bell-shaped furnace 61 is lifted and removed by the crane 67, whereafter the crane 67 is used again to hang the specimen case 30 at the hanging ring 43 and move the same to the pressurizing impregnating and carbonizing station B. At the station B, the specimen case 30 is placed onto the lower inner lid 55 on the transport bogie 57 at its retracted position (indicated in broken lines in FIG. 3). Subsequently, the transport bogie 57 moved to the location just below the high pressure vessel 50 while carrying the specimen case 30 thereon. The lifting device 59 then lifts the lower inner lid 55 on the transport bogie 57 together with the specimen case 30 until the specimen case 30 is inserted into the high pressure vessel 50 and the lower inner lid 55 is fitted in an airtight relationship into the lower outer lid 54.

Then, the press frame 56 is moved on the rail 56a to the location at which the high pressure vessel 50 is disposed, and the press frame 56 is fitted with the upper lid 53 and the lower inner lid 55 of the high pressure vessel 50. Consequently, the upper lid 53, lower inner lid 55 and lower outer lid 54 of the high pressure vessel 50 are secured to the high pressure tube 52 in a locked condition by the press frame 56. Accordingly, the various components of the high pressure vessel 50 maintain the enclosed spacing of the high pressure vessel 50 even if the internal pressure of the same is insreased to a high pressure level.

After then, the air in the inside of the high pressure vessel 50 is discharged to reach a vacuum condition by a suitable vacuum pump (not shown), and then argon gas of a high pressure is introduced into the inside of the high pressure vessel 50 from a suitable high pressure argon gas supply source to replace the gas within the high pressure vessel 50 with argon gas. When the inside of the high pressure vessel 50 is filled with such high pressure argon gas until a predetermined difference is caused between the internal pressure and the external pressure of the high pressure vessel 50, the gas admitting valve 35 is opened so that the argon gas of a high pressure is admitted also into the specimen case 30. Consequently, the pressure of the gas acts directly upon a free surface of the molten impregnant 9 such as tar pitch, and accordingly, impregnation of the shaped body 8 by such high pressure gas is accomplished.

Subsequently, the heater 70 is rendered operative to raise the temperature of the contents of the specimen case 30, and the pressure is further raised by introduction of pressurized argon gas. In this instance, the temperature rise is carried out gradually in order that generation of gas by sudden carbonization of the impregnant 9 such as tar pitch may be prevented. After the temperature is raised to a predetermined level (for example, 600° to 1,500° C.), the temperature is maintained while a predetermined pressure is also maintained in order to achieve carbonizing baking under the high pressure.

Figure 4:
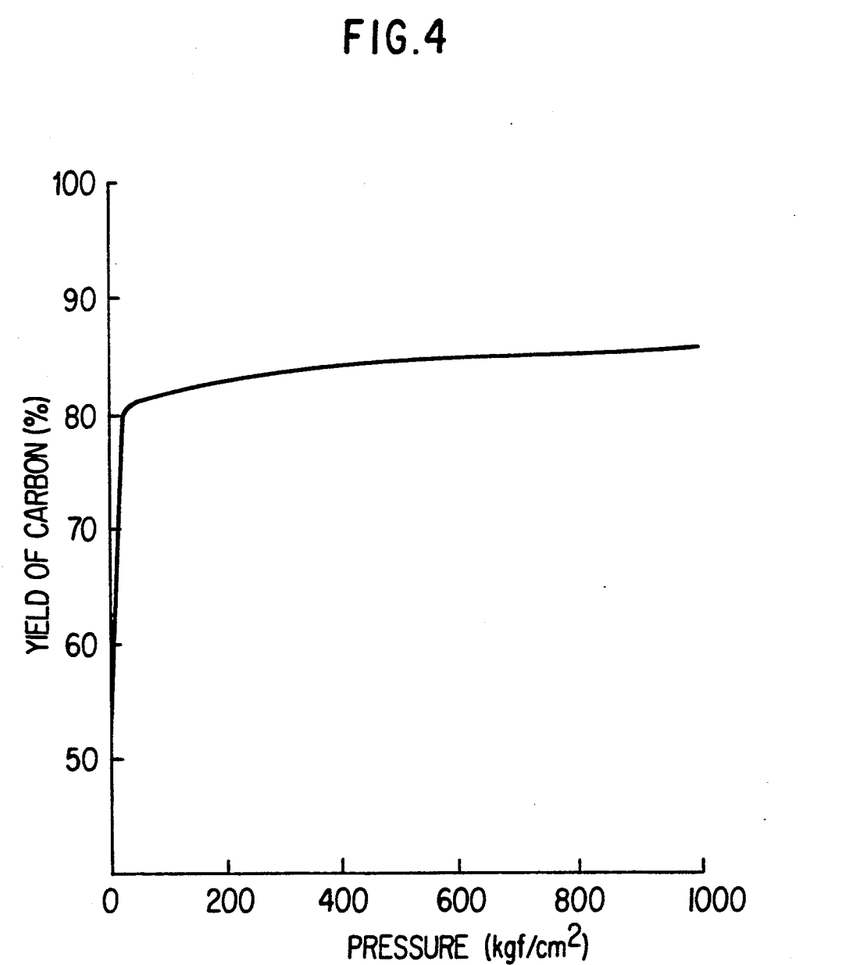
FIG. 4 is a graph showing a relationship between a pressure and a yield of carbon produced by the impregnating carbonating apparatus shown in FIG. 3.

Preferably the pressure upon such carbonizing baking is higher than 70 kgf/cm$^2$. FIG. 4 shows a relationship between a pressure and a yield of carbon, and in FIG. 4, the axis of abscissa indicates a pressure while the axis of ordinate indicates a yield of carbon. As apparently seen from FIG. 4, where the pressure applied exceeds 70 kgf/cm$^2$, the yield of carbon presents a sudden increase to a high value above 80%. On the higher side of the pressure than 70 kgf/cm$^2$, however, the effect of the improvement in yield of carbon by an increase in pressure is low. Accordingly, it is industrially suitable to set the pressure upon carbonizing baking to a value lower than 300 kgf/cm$^2$ with which the operation can be performed only with a pressure of gas from a high pressure gas bomb.

After completion of such carbonizing processing, the valve 68a is opened to permit argon gas to be discharged by way of the gas port 68 and the gas discharging opening 36 to lower the internal pressure of the specimen case 30. Then, after the temperature of the specimen case 30 is lowered to 300° C. or so but not waiting until the specimen case 30 is cooled to a room temperature, the specimen case 30 is removed from the high pressure vessel 50. After then, another new specimen case in which molten impregnant 9 is contained is set in position into the high pressure vessel 50 in a similar manner as described above, and a carbonizing processing is thereafter performed for the new specimen case.

It is to be noted that, in order to promote the carbonizing reaction described hereinabove, it is a preferable method for reduction of steps to insert a hydrogen occluding material in advance in the specimen case 30. Such hydrogen occluding material promotes a reaction of $CH_4 \rightarrow C + 2H_2$. Consequently, the carbonizing reaction is promoted.

Further, while in the embodiment described above the bell-shaped furnace 61 is used for heating impregnant such as tar pitch into a molten condition as shown in FIG. 3, such a modified structure may be employed that the heating device 69 installed in the inside of the high pressure vessel 50 can be removed in an integral relationship with the lower outer lid 54 and lower inner lid 55 to the outside of the high pressure vessel 50 so that the specimen case 30 may be heated outside the high pressure vessel 50 using the heating device 69 to melt the impregnant such as tar pitch.

In the following, a result of an impregnating carbonizing processing which was actually performed using the apparatus of the embodiment described above will be described.

A shaped body containing 30% in volume of carbon fiber of the PAN family and about 20% in volume of carbon (and having a porosity of about 48%) and a solid block of tar pitch were set in position into such a specimen case as shown in FIG. 2, and the internal air in the specimen case was discharged outside to put the inside of the specimen case into a vacuum condition at a location outside the high pressure vessel, whereafter the specimen case was heated to a temperature of about 250° C. The specimen case was maintained at 250° C. for a period of eight hours to melt the tar pitch, and then the entire specimen case was placed into the high pressure vessel. Then, argon gas was poured into the high pressure vessel to a pressure of about 1,000 kgf/cm$^2$ to dip the shaped body in the molten tar pitch, whereafter the specimen case was heated to 800° C. at a rate of temperature rise of about 100° C./hour. Then, the specimen case was maintained at 800° C. for three hours to carbonize and bake the tar pitch, and then, it was cooled in the furnace gradually for two hours. Subsequently, the argon gas was discharged, and the specimen case was taken out. Then, after waiting until the specimen case was cooled to a temperature proximate the room temperature, the article thus processed was taken out of the specimen case, and the remaining carbonized tar pitch was removed. Then, the specimen was examined. As a result, it was proved that the open porosity was about 12% and sufficient impregnation and carbonization were achieved. The period of time for which the high pressure vessel was about 11 hours. Accordingly, the series of steps were processed for a period of time about one half the period of time which is required when tar pitch is melted in the high pressure vessel.

Having now fully described the invention, it will be apparent to one of ordinary skill in the art that many changes and modifications can be made thereto without departing from the spirit and scope of the invention as set forth herein.

What is claimed is:

1. An impregnating carbonizing process, comprising the steps of:

inserting a porous shaped body of carbon and a block of impregnant into a specimen case which has a gas admitting valve which can be opened to admit gas from the outside into the inside of said specimen case when a predetermined difference in pressure is caused between the outside and the inside of said specimen case and which further has a gas discharging opening for discharging the internal gas of said specimen case therethrough; discharging, at a reduced pressure impregnating station, gas from the inside of said specimen case by way of said gas discharging opening of said specimen case; heating the impregnant from the outside of said specimen case to melt the impregnant; inserting said specimen case into a high pressure vessel at a high pressure impregnating carbonizing station; admitting gas of a high pressure into said high pressure vessel until the predetermined difference in pressure between the outside and the inside of said specimen case is achieved, thereby opening said gas admitting valve so as to penetrate the impregnant into the shaped body of carbon under the pressure of the high pressure gas; heating the shaped body to a high temperature; and discharging the high presure gas by way of said gas discharging opening to lower the pressure within said specimen case at a controlled rate in response to a pressure within said high pressure vessel to carbonize part or the entirety of the impregnant.

2. An impregnating carbonizing process according to claim 1, wherein the shaped body of carbon is either a shaped body containing graphite or a shaped body containing carbon fiber.

3. An impregnating carbonizing process according to claim 1, wherein a hydrogen occluding material is disposed in said specimen case.

4. An impregnating carbonizing process according to claim 1, wherein a difference between the pressure within said high pressure vessel and the pressure within said specimen case is detected, and the pressure within said specimen case is lowered at a controlled rate in response to the thus detected pressure difference.

5. The process of claim 1, wherein said high pressure is greater than 70 kgf/cm$^2$ and lower than 300 kgf/cm$^2$.

6. The process of claim 1, wherein said high temperature is from 600°–1,500° C.

7. The process of claim 1, wherein said impregnant is tar pitch.

8. The process of claim 1, wherein said gas admitting valve is a one-way valve.

* * * * *